(12) United States Patent
Vu

(10) Patent No.: US 8,596,157 B2
(45) Date of Patent: Dec. 3, 2013

(54) POWERSHIFT TRANSMISSION WITH TWENTY-FOUR FORWARD MODES

(75) Inventor: Thomas H. Vu, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 747 days.

(21) Appl. No.: 12/868,037

(22) Filed: Aug. 25, 2010

(65) Prior Publication Data

US 2012/0048043 A1  Mar. 1, 2012

(51) Int. Cl.
*F16H 3/08* (2006.01)

(52) U.S. Cl.
USPC .......................................................... 74/331

(58) Field of Classification Search
USPC ................... 74/330, 331, 340, 325
See application file for complete search history.

(56) References Cited

U.S. PATENT DOCUMENTS

| | | | | |
|---|---|---|---|---|
| 3,916,714 | A * | 11/1975 | Sisson et al. | 74/331 |
| 4,858,495 | A * | 8/1989 | Horsch | 74/745 |
| 5,573,471 | A * | 11/1996 | Shubinsky et al. | 475/207 |
| 7,121,161 | B2 * | 10/2006 | Hatakeyama | 74/359 |
| 8,356,528 | B2 * | 1/2013 | Kuma et al. | 74/330 |

\* cited by examiner

*Primary Examiner* — Ha D Ho
*Assistant Examiner* — Jude Agendia

(57) ABSTRACT

The powershift transmission comprises nine clutches and eighteen gears, not including the clutches and gears necessary for reverse modes. The powershift transmission provides twenty-four forward modes; a high total transmission ratio of 26.2; and smooth shift steps that are, generally, 15% or less. As such, the transmission utilizes a minimum number of components, while still being extremely functional and versatile.

19 Claims, 6 Drawing Sheets

| DESCRIPTION | REFERENCE NUMERAL | TOOTH COUNT |
|---|---|---|
| First Gear | G1 | 44 |
| Second Gear | G2 | 39 |
| Third Gear | G3 | 43 |
| Fourth Gear | G4 | 43 |
| Fifth Gear | G5 | 42 |
| Sixth Gear | G6 | 30 |
| Seventh Gear | G7 | 36 |
| Eighth Gear | G8 | 25 |
| Ninth Gear | G9 | 44 |
| Tenth Gear | G10 | 55 |
| Eleventh Gear | G11 | 50 |
| Twelfth Gear | G12 | 64 |
| Thirteenth Gear | G13 | 61 |
| Fourteenth Gear | G14 | 43 |
| Fifteenth Gear | G15 | 21 |
| Sixteenth Gear | G16 | 20 |
| Seventeenth Gear | G17 | 42 |
| Eighteenth Gear | G18 | 61 |
| Reverse Drive Gear | RG1 | 26 |
| Reverse Idler Gear | RG2 | 26 |
| Reverse Driven Gear | RG3 | 56 |

| GEAR | REV | LO | HI | C1 | C2 | C3 | C4 | R1 | R2 | R3 | INPUT SHAFT S1 SPEED (RPM) | COUNTER SHAFT S2 SPEED (RPM) | COUNTER SHAFT S3 SPEED (RPM) | OUTPUT SHAFT S4 SPEED (RPM) | TOTAL RATIO | STEPS % |
|---|---|---|---|---|---|---|---|---|---|---|---|---|---|---|---|---|
| F1  |  | X |   | X |   |   |   | X |   |   | 2100 | -1,861 | 763   | -250   | -8.390 |   |
| F2  |  |   | X | X |   |   |   | X |   |   | 2100 | -2,149 | 881   | -289   | -7.267 | 15 |
| F3  |  | X |   |   | X |   |   | X |   |   | 2100 | -1,861 | 1,015 | -333   | -6.304 | 15 |
| F4  |  |   | X |   | X |   |   | X |   |   | 2100 | -2,149 | 1,172 | -385   | -5.460 | 15 |
| F5  |  | X |   |   |   | X |   | X |   |   | 2100 | -1,861 | 1,340 | -440   | -4.775 | 14 |
| F6  |  |   | X |   |   | X |   | X |   |   | 2100 | -2,149 | 1,547 | -508   | -4.137 | 15 |
| F7  |  | X |   |   |   |   | X | X |   |   | 2100 | -1,861 | 1,777 | -583   | -3.602 | 15 |
| F8  |  |   | X |   |   |   | X | X |   |   | 2100 | -2,149 | 2,051 | -673   | -3.120 | 15 |
| F9  |  | X |   | X |   |   |   |   | X |   | 2100 | -1,861 | 763   | -781   | -2.689 | 16 |
| F10 |  |   | X | X |   |   |   |   | X |   | 2100 | -2,149 | 881   | -902   | -2.329 | 15 |
| F11 |  | X |   |   | X |   |   |   | X |   | 2100 | -1,861 | 1,015 | -1,039 | -2.020 | 15 |
| F12 |  |   | X |   | X |   |   |   | X |   | 2100 | -2,149 | 1,172 | -1,200 | -1.750 | 15 |
| F13 |  | X |   |   |   | X |   |   | X |   | 2100 | -1,861 | 1,340 | -1,372 | -1.531 | 14 |
| F14 |  |   | X |   |   | X |   |   | X |   | 2100 | -2,149 | 1,547 | -1,584 | -1.326 | 15 |
| F15 |  | X |   |   |   |   | X |   | X |   | 2100 | -1,861 | 1,777 | -1,819 | -1.154 | 15 |
| F16 |  |   | X |   |   |   | X |   | X |   | 2100 | -2,149 | 2,051 | -2,100 | -1.000 | 15 |
| F17 |  | X |   | X |   |   |   |   |   | X | 2100 | -1,861 | 763   | -2,441 | -0.860 | 16 |
| F18 |  |   | X | X |   |   |   |   |   | X | 2100 | -2,149 | 881   | -2,818 | -0.745 | 15 |
| F19 |  | X |   |   | X |   |   |   |   | X | 2100 | -1,861 | 1,015 | -3,249 | -0.646 | 15 |
| F20 |  |   | X |   | X |   |   |   |   | X | 2100 | -2,149 | 1,172 | -3,751 | -0.560 | 15 |
| F21 |  | X |   |   |   | X |   |   |   | X | 2100 | -1,861 | 1,340 | -4,289 | -0.490 | 14 |
| F22 |  |   | X |   |   | X |   |   |   | X | 2100 | -2,149 | 1,547 | -4,951 | -0.424 | 15 |
| F23 |  | X |   |   |   |   | X |   |   | X | 2100 | -1,861 | 1,777 | -5,686 | -0.369 | 15 |
| F24 |  |   | X |   |   |   | X |   |   | X | 2100 | -2,149 | 2,051 | -6,564 | -0.320 | 15 |

TOTAL TRANSMISSION RATIO  26.2

| GEAR | CLUTCHES ENGAGED ||||||||||| INPUT SHAFT S1 SPEED (RPM) | COUNTER SHAFT S2 SPEED (RPM) | COUNTER SHAFT S3 SPEED (RPM) | OUTPUT SHAFT S4 SPEED (RPM) | REVERSAL SHAFT S5 SPEED (RPM) |
|---|---|---|---|---|---|---|---|---|---|---|---|---|---|---|---|---|
| | REV | LO | HI | C1 | C2 | C3 | C4 | R1 | R2 | R3 | | | | | |
| R1 | X | | | X | | | | X | | | 2100 | 975 | -400 | 131 | -2100 |
| R2 | X | | | | X | | | X | | | 2100 | 975 | -532 | 175 | -2100 |
| R3 | X | | | | | X | | X | | | 2100 | 975 | -702 | 230 | -2100 |
| R4 | X | | | | | | X | X | | | 2100 | 975 | -931 | 305 | -2100 |
| R5 | X | | | X | | | | | X | | 2100 | 975 | -400 | 409 | -2100 |
| R6 | X | | | | X | | | | X | | 2100 | 975 | -532 | 544 | -2100 |
| R7 | X | | | | | X | | | X | | 2100 | 975 | -702 | 719 | -2100 |
| R8 | X | | | | | | X | | X | | 2100 | 975 | -931 | 953 | -2100 |
| R9 | X | | | X | | | | | | X | 2100 | 975 | -400 | 1279 | -2100 |
| R10 | X | | | | X | | | | | X | 2100 | 975 | -532 | 1702 | -2100 |
| R11 | X | | | | | X | | | | X | 2100 | 975 | -702 | 2246 | -2100 |
| R12 | X | | | | | | X | | | X | 2100 | 975 | -931 | 2978 | -2100 |

Fig. 5

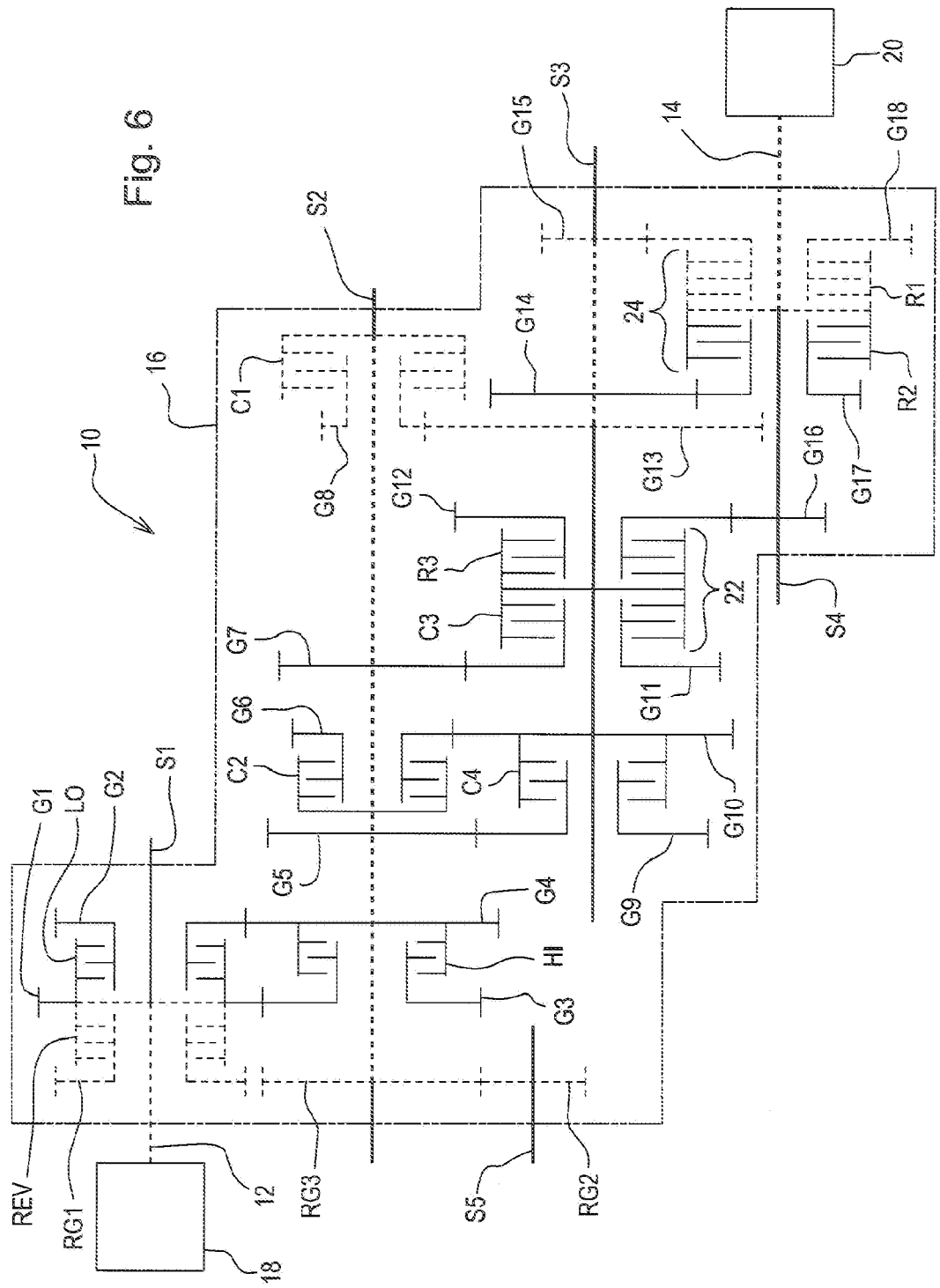

POWERSHIFT TRANSMISSION WITH TWENTY-FOUR FORWARD MODES

FIELD OF THE DISCLOSURE

The present disclosure relates to powershift transmissions. More particularly, the present disclosure relates to powershift transmissions with twenty-four forward modes for use in work machines.

BACKGROUND OF THE DISCLOSURE

A powershift transmission is a speed and power changing device installed between a power source and a final drive of a work machine. Powershift transmissions are often used in work machines such as, for example, agricultural and industrial machines.

A powershift transmission has lower forward modes and higher forward modes. The lower forward modes are, typically, used for propelling work machines at low speeds. In lower forward modes, an output shaft of the powershift transmission is rotating slowly but with a relatively high amount of torque. On the other hand, the higher forward modes are, generally, for propelling the work machine at high speeds in, for example, transport. In higher forward modes, the output shaft of the powershift transmission is rotating relatively quickly but with a relatively low amount of torque.

It is generally desirable for a powershift transmission to have a high total transmission ratio (i.e., 24:1 or higher) to propel the work machine effectively at both low and high speeds. It is also desirable that the steps, between forward modes, be as small as possible (i.e., 17% or lower). Small steps promote smooth mode changes and enhance operator comfort. It is also desirable for a powershift transmission to have the fewest number of parts possible to minimize production costs.

In the past, powershift transmissions comprising nine clutches and eighteen gears—not including the clutches and gears specifically necessary for reverse modes—usually had either eighteen or twenty forward modes. For example, a first known powershift transmission design had six speed clutches, three range clutches, and eighteen gears for use in forward modes. This first known powershift transmission had only eighteen forward gear modes. As another example, a second known powershift transmission had five speed clutches, four range clutches, and eighteen gears for use in forward motion but had only twenty shiftable gears.

SUMMARY OF THE DISCLOSURE

The disclosed powershift transmission comprises nine clutches and eighteen gears, not including the clutches and gears necessary specifically for reverse modes. The disclosed powershift transmission provides twenty-four forward modes; a high total transmission ratio of 26.2; and smooth shift steps that are, generally, 16% or less. As such, the disclosed transmission utilizes a minimum number of components, while still being very functional and versatile.

BRIEF DESCRIPTION OF THE DRAWINGS

The detailed description of the drawings refers to the accompanying figures:

FIG. 2 is a chart identifying the number of teeth on each gear in an embodiment of the powershift transmission;

FIG. 3 is a chart identifying the engaged clutches, shaft speeds, and transmission ratios for the powershift transmission's forward modes;

FIG. 5 is a chart identifying the engaged clutches, shaft speeds, and transmission ratios for the powershift transmission's reverse modes; and FIG. 6 is a schematic of the powershift transmission illustrating the power flow in a reverse mode R1.

DETAILED DESCRIPTION OF THE DRAWINGS

Figure 1:
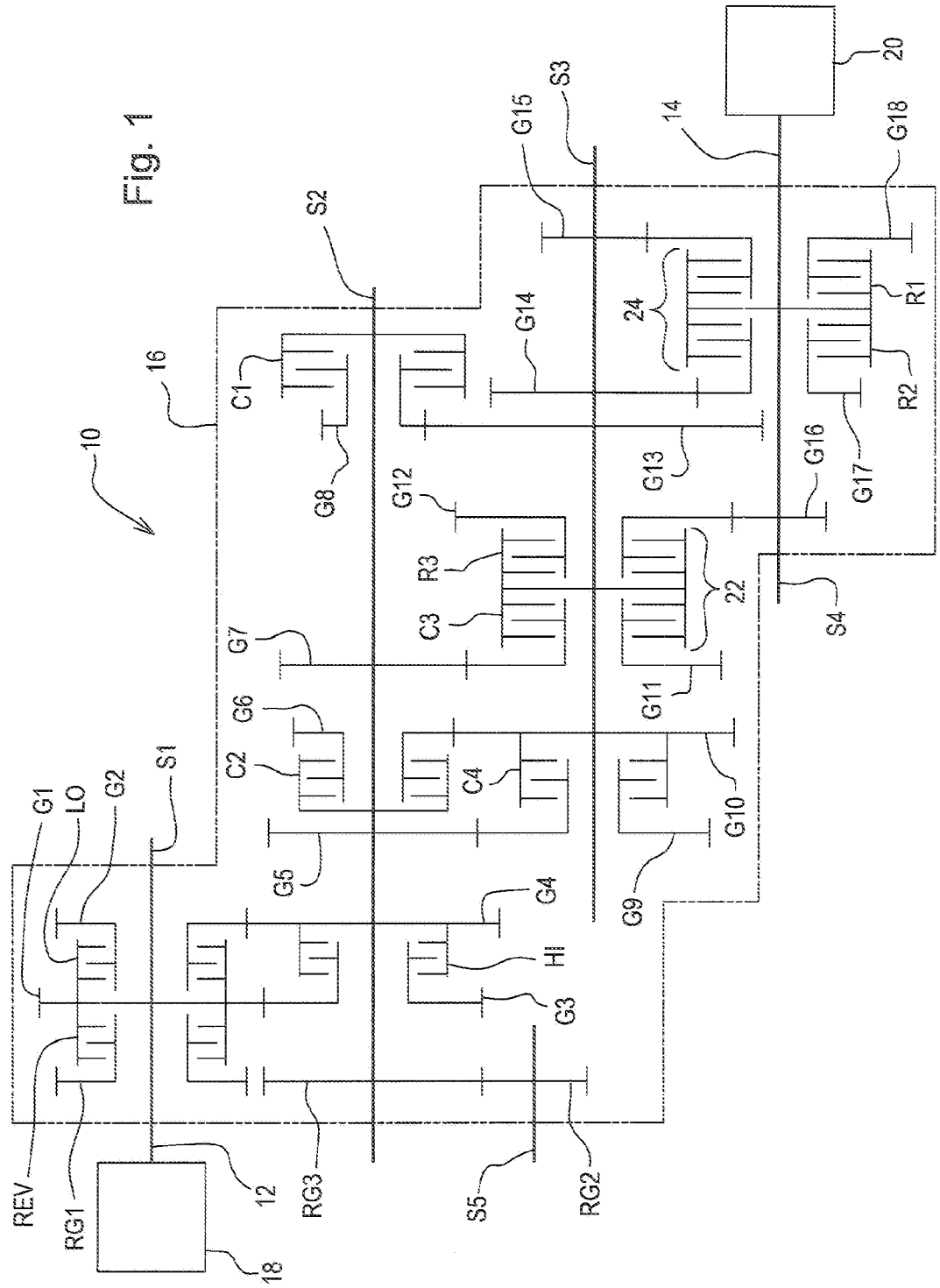
FIG. 1 is a schematic of an embodiment of a powershift transmission.

In the detailed description of the drawings, the reference numerals will take the following forms: G for gears, RG for reverse gears, S for shafts, C for speed clutches, and R for range clutches.

FIG. 1 is a schematic of an embodiment of a powershift transmission 10. As shown, powershift transmission 10 comprises an input shaft S1, a first countershaft S2, a second countershaft S3, an output shaft S4, and an idler shaft S5. The shafts may be made of, for example, alloy steel AISI 8620. The gears of powershift transmission 10, as discussed below, also may be made of alloy steel AISI 8620, and the gears are, for example, spur gears. Input shaft S1 is rotatably mounted to a housing 16, and an input end 12 of input shaft S1 is connected to a power source 18, and power source 18 is capable of rotating input shaft S1. Power source 18 may be, for example, a diesel or gas engine.

A first gear G1 is mounted about input shaft S1 and fixed for rotation therewith. Exemplarily, first gear G1 may be formed into or splined or welded about input shaft S1.

A reverse clutch REV is mounted about input shaft S1 and fixed for rotation therewith. Further, reverse clutch REV may be formed into gear G1, mounted to gear G1, or mounted alone. Clutch REV may be a wet clutch. Clutch REV may be, for example, splined or welded about input shaft S1.

A low clutch LO is mounted about input shaft S1 and fixed for rotation therewith. Clutch LO may be formed into gear G1, mounted to gear G1, or mounted alone. Exemplarily, clutch LO may be splined or welded about input shaft S1, and clutch LO may be a wet clutch. Gear G1, clutch REV, and clutch LO may be, for example, formed together as one assembly.

A reverse drive gear RG1 and a second gear G2 are rotatably mounted about input shaft S1. Reverse drive gear RG1 is in communication for engagement with clutch REV. When clutch REV is engaged, clutch REV fixes reverse drive gear RG1 for rotation with input shaft S1. Gear G2 is in communication for engagement with clutch LO. When clutch LO is engaged, clutch LO fixes gear G2 for rotation with input shaft S1.

Countershaft S2 is rotatably mounted to housing 16. A fourth gear G4, a fifth gear G5, a seventh gear G7, and a reverse driven gear RG3 are all mounted about countershaft S2 and are all fixed for rotation therewith. Exemplarily, these gears may be splined or welded to countershaft S2.

A high clutch HI may be formed into gear G4; mounted to gear G4; or mounted alone, for example. Further, Clutch HI may be, for example, splined or welded to countershaft S2. Clutch HI may be a wet clutch. Gear G4 meshes continuously with gear G2. A third gear G3 is in communication for engagement with clutch HI. When clutch HI is engaged, clutch HI fixes gear G3 for rotation with countershaft S2. Additionally, gear G3 is rotatably mounted about countershaft S2 and meshes continuously with gear G1.

A second speed clutch C2 is mounted about countershaft S2 and is fixed for rotation therewith. Clutch C2 may be, for example, splined to or welded to countershaft S2. Clutch C2 may be a wet clutch. A sixth gear G6 is rotatably mounted about countershaft S2, and gear G6 is in communication for engagement with clutch C2. When clutch C2 is engaged, clutch C2 fixes G6 for rotation with countershaft S2.

Further, a first speed clutch C1 is mounted about countershaft S2 and is fixed for rotation therewith. Exemplarily, clutch C1 may be splined or welded to countershaft S2, and clutch C1 may be a wet clutch. An eighth gear G8 is rotatably mounted about countershaft S2. Further, gear G8 is in communication for engagement with clutch C1. When clutch C1 is engaged, clutch C1 fixes gear G8 for rotation with countershaft S2.

Countershaft S3 is rotatably mounted to housing 16. A tenth gear G10, a thirteenth gear G13, a fourteenth gear G14, and a fifteenth gear G15 are all mounted about countershaft S3 and fixed for rotation therewith. Gear G13 meshes continuously with gear G8.

A fourth speed clutch C4 may be formed into gear G10, mounted to gear G10, or mounted alone. Exemplarily, clutch C4 may be splined or welded to countershaft S3, and clutch C4 may be a wet clutch. Gear G10 meshes continuously with gear G6. A ninth gear G9 is rotatably mounted about countershaft S3 and is in communication for engagement with clutch C4. When clutch C4 is engaged, clutch C4 fixes gear G9 for rotation with countershaft S3. Gear G9 meshes continuously with gear G5.

A third speed clutch C3 is mounted about countershaft S3 and is fixed for rotation therewith. Clutch C3 may be, for example, splined or welded to countershaft S3, and clutch C3 may be a wet clutch. An eleventh gear G11 is rotatably mounted about countershaft S3. Additionally, gear G11 is in communication for engagement with clutch C3. When clutch C3 is engaged, clutch C3 fixes gear G11 for rotation with countershaft S2. Gear G11 meshes continuously with gear G7.

A third range clutch R3 is also mounted about countershaft S3. Clutch R3 may be, for example, splined to or welded to countershaft S3, and clutch R3 may be a wet clutch. Clutch C3 and clutch R3 may be formed together to form a first double clutch 22. A twelfth gear G12 is rotatably mounted about countershaft S3 and is in communication for engagement with clutch R3. Clutch R3 can engage gear G12 and, therefore, fix gear G12 for rotation with countershaft S3.

Output shaft S4 is rotatably mounted to housing 16. A sixteenth gear G16 is mounted about output shaft S4 and is fixed for rotation therewith. Gear G16 may be splined or welded to output shaft S4. Further, gear G16 meshes continuously with gear G12.

A first range clutch R1 is mounted about output shaft S4 and fixed for rotation therewith. Clutch R1 may be, for example, splined or welded to output shaft S4, and clutch R1 may be a wet clutch. When clutch R1 is engaged, clutch R1 fixes an eighteenth gear G18 for rotation with output shaft S4. Gear G18 meshes continuously with gear G15.

Additionally, a second range clutch R2 is also mounted about output shaft S4 and fixed for rotation therewith. Exemplarily, Clutch R2 may be splined or welded to shaft S4, and clutch R2 may be a wet clutch. Clutch R2 and clutch R1 may form a second double clutch 24. A seventeenth gear G17 is rotatably mounted to output shaft S4, gear G17 is in communication for engagement with clutch R2. Clutch R2 can engage gear G17 and, thus, fix gear G17 for rotation with output shaft S4. Further, gear G17 meshes continuously with gear G14.

Idler shaft S5 is rotatably mounted to housing 16. A reverse idler gear RG2 is mounted about idler shaft S5 and is fixed for rotation therewith. Gear RG2 may, for example, be splined or welded to idler shaft S5, and gear RG2 meshes continuously with gear RG3. In addition, despite what FIG. 1 illustrates, gear RG2 also meshes continuously with gear RG1. In FIG. 1, idler shaft S5 and gear RG2 are placed, as such, for simplification and clarification.

FIG. 2 is a chart identifying the number of teeth on each gear in an embodiment of the powershift transmission. In other embodiments of powershift transmission 10, the number of teeth on the respective gears may vary.

Forward Modes of Operation

FIG. 3 illustrates which clutches are engaged in forward modes F1-F24. In forward modes, the following clutches are engaged: one of clutches LO and HI, one of clutches C1-C4, and one of clutches R1-R3.

Figure 4:
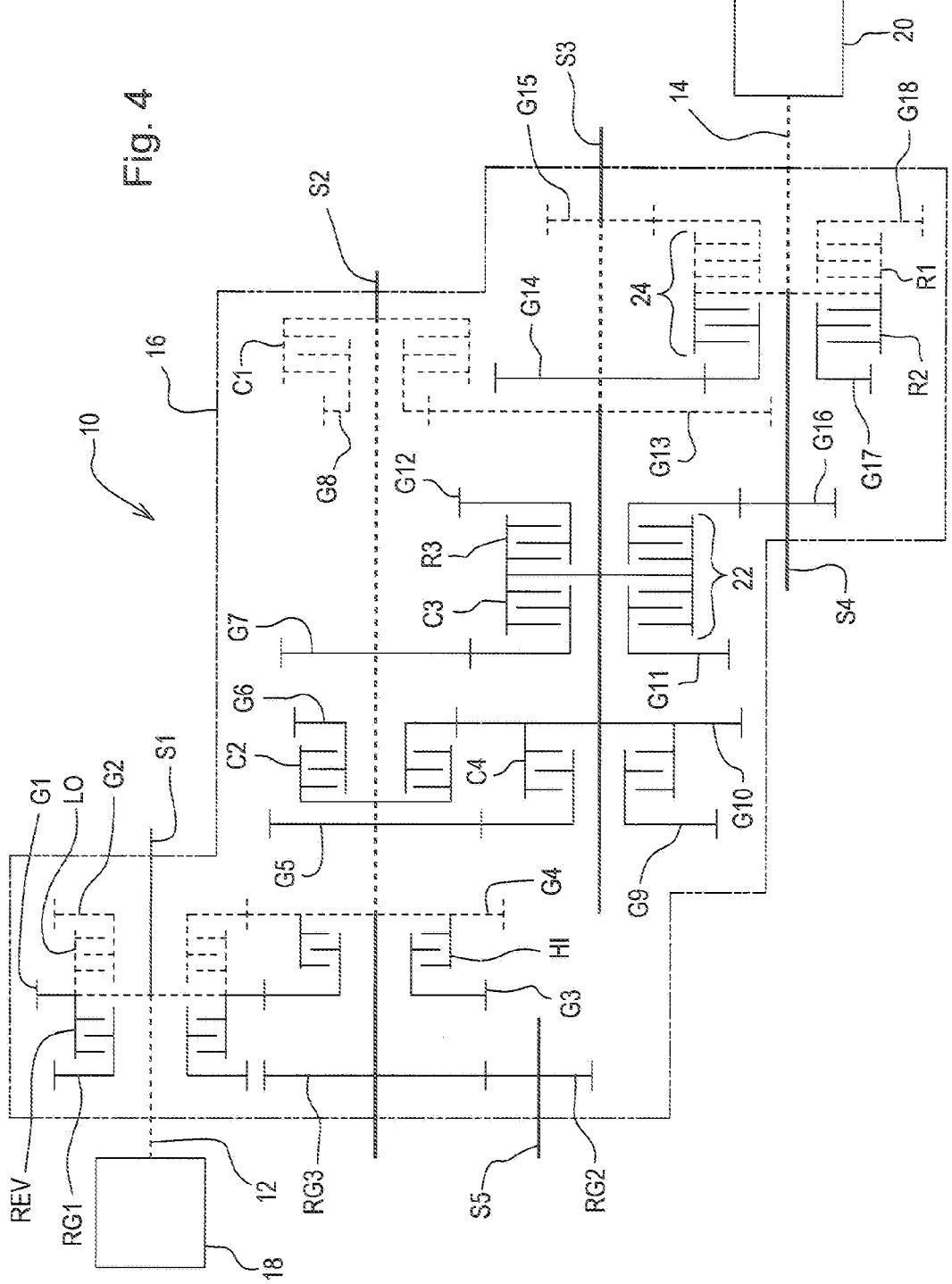
FIG. 4 is a schematic of the powershift transmission illustrating the power flow in a forward mode F1.

Mode F1, as shown in FIG. 3, is illustrated in FIG. 4. In mode F1, clutch LO, clutch C1, and clutch R1 are engaged. Input end 12 of input shaft S1 is connected to power source 18. Power source 18 is capable of rotating input shaft S1.

The rotation of input shaft S1 causes gear G1, clutch LO, and clutch REV to rotate. Clutch LO is engaged and, thus, fixes gear G2 for rotation with clutch LO and input shaft S1. In contrast, clutch REV is not engaged and, thus, does not fix gear RG1 for rotation with input shaft S1. Accordingly; gear RG1 does not cause gear RG2 to rotate, and gear RG2 does not cause gear RG3 to rotate.

The rotation of gear G2 causes gear G4 and, therefore, countershaft S2 to rotate. The rotation of countershaft S2, then, causes gears G5, G7, and RG3 and clutches C1, C2, and HI to rotate. Clutch HI is not engaged and, therefore, does not fix gear G3 for rotation with countershaft S2. Because of this, even though gear G1 rotates gear G3, the rotation of gear G3 does not affect the rotation of clutch HI or countershaft S2.

Clutch C2 is not engaged. Thus, even though gear G10 causes gear G6 to rotate, the rotation of gear G6 does not affect the rotation of clutch C2 or countershaft S2. In contrast, clutch C1 is engaged and, therefore, gear G8 rotates with clutch C1 and countershaft S2. The rotation of gear G8 causes gear G13 to rotate, and gear G13 causes countershaft S3 to rotate.

The rotation of countershaft S3 causes gears G10, G13, G14, and G15 and clutches C3, C4, and R3 to rotate. Clutches C3, C4, and R3 are not engaged. Because Clutch C3 is not engaged, the rotation of gear G11 does not affect the rotation of clutch C3 or countershaft S3. Further, because clutch C4 is not engaged, the rotation of gear G9 does not affect the rotation of clutch C4 or countershaft S3. Further yet, clutch R3 is not engaged. Accordingly, the rotation of gear G12 does not affect the rotation of clutch R3 or countershaft S3.

Gear G15 rotates gear G18. Because range clutch R1 is engaged, gear G18 rotates range clutch R1, and the rotation of clutch R1 causes output shaft S4 to rotate. A drive end 14 of output shaft S4 rotates and is connected to final drive 20 of the work machine (not shown) for forward movement. Final drive 20 may be, for example, a differential assembly (not shown) and an axle assembly (not shown). Range clutch R2 is not engaged. Thus, gear G17 is free to rotate relative to range clutch R2 and output shaft S4.

FIG. 3 discloses the corresponding speeds of the shafts of the powershift transmission 10, assuming that the input shaft is rotating at 2100 rpm. Powershift transmission 10 may operate with a variety of input speeds. The rotational speed of 2100 rpm is used for illustrative purposes only. In forward modes, the rotational speeds for input shaft S1 and countershaft S3 are positive. In contrast, the rotational speeds for countershaft S2 and output shaft S4 are negative. This is because shafts S1 and S3 rotate, in one direction, while shafts S2 and S4 rotate in the opposite direction.

Further, FIG. 3 discloses the transmission ratios associated with modes F1-F24. For example the transmission ratio for mode F1 is −8.390. This value is found by dividing shaft S1's rotational speed by shaft S4's rotational speed.

Further yet, FIG. 3 discloses the step percentages between each shift. For example, the step percentage when shifting from mode F1 to mode F2 is 15%. As shown, in FIG. 3, most steps are 15% or lower. The smaller steps between gears are desirable for good shift quality.

Reverse Modes of Operation

FIG. 5 illustrates which clutches are engaged in reverse modes R1-R12. In reverse modes, the following clutches are engaged: the reverse clutch, one of clutches C1-C4, and one of clutches R1-R3. For illustrative purposes, reverse mode R1 is shown in FIG. 6. In reverse mode R1, clutches REV, C1, and R1 are engaged. Thus, because clutch REV is engaged, reverse drive gear RG1 rotates with clutch REV. Gear RG1 rotates gear RG2. Clutch LO is not engaged. Thus, the rotation of clutch LO does not affect the rotation of gear G2.

The rotation of gear RG2 causes gear RG3 to rotate. Because gear RG3 is mounted about countershaft S2 and fixed for rotation therewith, the rotation of gear RG3 rotates countershaft S2. Clutch HI is fixed to countershaft S2; however, clutch HI is not engaged. Thus, the rotation of gear G3 does not affect the rotation of clutch HI.

Gears G5 and G7 are mounted about countershaft S2 and are fixed for rotation therewith. Clutch C2 also rotates with countershaft S2. However, clutch C2 is not engaged, and gear G6 is not fixed for rotation therewith. Alternatively, clutch C1 is engaged, and gear G8 is fixed for rotation therewith.

Gear G8 rotates gear G13. Gear G13, which is fixed for rotation about countershaft S3, rotates countershaft S3. Gears G10, G13, and G14 and clutches C3, C4, and R3 rotate with countershaft S3. Clutches C3, C4, and R3 are all unengaged. Thus, gears G9, G11, and G12 are not engaged for rotation with countershaft S3.

Clutches C3, C4, and R3 rotate with countershaft S3. Gear G7 rotates gear G11, but the rotation of gear G11 does not rotate clutch C3 or countershaft S3, because clutch C3 is unengaged. Likewise, gear G5 rotates gear G9, but the rotation of gear G9 does not rotate clutch C4 or countershaft S3, because clutch C4 is unengaged. Also, likewise, gear G16 rotates gear G12, but the rotation of gear G12 does rotate clutch R3 or countershaft S3, because clutch R3 is unengaged.

Gear G14 is mounted about countershaft S3 and is fixed for rotation therewith. The rotation of gear G14 rotates gear G17. Countershaft S3 rotates gear G15, and gear G15 rotates gear G18. Clutch R1 is mounted about output shaft S4 and is engaged. As such, the rotation of gear G18 rotates clutch R1, and clutch R1 rotates output shaft S4. A drive end 14 of output shaft S4 is connected to final drive 20 of the work machine for backwards movement. Clutch R2 is not engaged. Thus, even through gear G14 rotates gear G17, gear G17 does not rotate output shaft S4. Further, clutch R3 is not engaged. Thus, gear G16 rotates gear G12, but gear G12 does not rotate clutch R3 or countershaft S3.

FIG. 5 discloses the clutch engagement scheme for the other reverse modes, modes R2-R12, as well. Additionally, FIG. 5 discloses that input shaft S1 rotates at a speed of 2100 rpm. The rotational speed of 2100 rpm is for illustrative purposes only.

The rotational speeds of shafts S1, S2, and S4 are positive. In contrast, the rotational speeds of shafts S3 and S5 are negative. This is because shafts S1, S2, and S4 rotate in one direction, and shafts S3 and S5 rotate in the opposite direction. In modes F1-F24, input shaft S1 rotates in one direction, and output shaft S4 rotates the opposite direction. This causes the work machine to travel forward. Alternatively, in reverse modes R1-R12, the inclusion of idler shaft S5 allows input shaft S1 and output shaft S4 to rotate in the same direction. Ultimately, this causes the work machine to travel backwards While the disclosure has been illustrated and described in detail in the drawings and foregoing description, such illustration and description is to be considered as exemplary and not restrictive in character. It should be understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A twenty-four speed powershift transmission for a work machine, comprising:
    a transmission housing;
    an input shaft rotatably mounted to the housing;
    a first gear and a low clutch mounted about the input shaft and fixed for rotation therewith;
    a second gear rotatably mounted about the input shaft, wherein the second gear is in communication for engagement with the low clutch, and engagement of the low clutch fixes the second gear for rotation with the input shaft;
    a first countershaft rotatably mounted to the housing;
    a third gear rotatably mounted about the first countershaft;
    a fourth gear and a fifth gear mounted about the first countershaft and fixed for rotation therewith;
    a sixth gear rotatably mounted about the first countershaft;
    a seventh gear, a high clutch, a first speed clutch, and a second speed clutch mounted about the first countershaft and fixed for rotation therewith;
    an eighth gear rotatably mounted about the first countershaft;
    wherein the third gear is in communication for engagement with the high clutch such that engagement of the high clutch fixes the third gear for rotation with the first countershaft, and the third gear meshes continuously with the first gear;
    wherein the fourth gear meshes continuously with the second gear;
    wherein the sixth gear is in communication for engagement with the second speed clutch such that engagement of the second speed clutch fixes the sixth gear for rotation with the first countershaft; and
    wherein the eighth gear is in communication for engagement with the first speed clutch such that engagement of the first speed clutch fixes the eighth gear for rotation with the first countershaft.

2. The twenty-four speed powershift transmission for a work machine of claim 1, further comprising:
    a second countershaft rotatably mounted to the housing;
    a ninth gear rotatably mounted about the second countershaft;
    a tenth gear mounted about the second countershaft and fixed for rotation therewith, wherein the tenth gear is in constant mesh with the sixth gear;

an eleventh gear and a twelfth gear rotatably mounted about the second countershaft;

a thirteenth gear, a fourteenth gear, a fifteenth gear, a third speed clutch, a fourth speed clutch, and a third range clutch mounted about the second countershaft and fixed for rotation therewith;

wherein the thirteenth gear is in constant mesh with the eighth gear;

wherein the ninth gear is in communication for engagement with the fourth speed clutch such that engagement of the fourth speed clutch fixes the ninth gear for rotation with the second countershaft, and the ninth gear is in constant mesh with the fifth gear;

wherein the eleventh gear is in communication for engagement with the third speed clutch such that engagement of the third speed clutch fixes the eleventh gear for rotation with the second countershaft, and the eleventh gear is in constant mesh with the seventh gear; and wherein the twelfth gear is in communication for engagement with the third range clutch such that engagement of the third range clutch fixes the twelfth gear for rotation with the second countershaft.

3. The twenty-four speed powershift transmission for a work machine of claim 2, further comprising:

an output shaft rotatably mounted to the housing;

a sixteenth gear mounted about the output shaft and fixed for rotation therewith, wherein the sixteenth gear is in constant mesh with the twelfth gear;

a first range clutch and a second range clutch mounted about the output shaft and fixed for rotation therewith;

a seventeenth gear rotatably mounted about the output shaft, wherein the seventeenth gear is in communication for engagement with the second range clutch such that engagement of the second range clutch fixes the seventeenth gear for rotation with the output shaft, and the seventeenth gear is in constant mesh with the fourteenth gear; and an eighteenth gear rotatably mounted about the output shaft, wherein the eighteenth gear is in communication for engagement with the first range clutch such that engagement of the first range clutch fixes the eighteenth gear for rotation with the output shaft, and the eighteenth gear is in constant mesh with the fifteenth gear.

4. The twenty-four speed powershift transmission for a work machine of claim 1, wherein the number of teeth on the third gear divided by the number of teeth on the first gear is within twenty percent of 0.98.

5. The twenty-four speed powershift transmission for a work machine of claim 1, wherein the number of teeth on the fourth gear divided by the number of teeth on the second gear is within twenty percent of 1.10.

6. The twenty-four speed powershift transmission for a work machine of claim 2, wherein the number of teeth on the ninth gear divided by the number of teeth on the fifth gear is within twenty percent of 1.05.

7. The twenty-four speed powershift transmission for a work machine of claim 2, wherein the number of teeth on the tenth gear divided by the number of teeth on the sixth gear is within twenty percent of 1.83.

8. The twenty-four speed powershift transmission for a work machine of claim 2, wherein the number of teeth on the eleventh gear divided by the number of teeth on the seventh gear is within twenty percent of 1.39.

9. The twenty-four speed powershift transmission for a work machine of claim 2, wherein the number of teeth on the thirteenth gear divided by the number of teeth on the eighth gear is within twenty percent of 2.44.

10. The powershift transmission for a work machine of claim 2, wherein the third speed clutch and the third range clutch form a first double clutch.

11. The twenty-four speed powershift transmission for a work machine of claim 3, wherein the number of teeth on the sixteenth gear divided by the number of teeth on the twelfth gear is within twenty percent of 0.31.

12. The twenty-four speed powershift transmission for a work machine of claim 3, wherein the number of teeth on the seventeenth gear divided by the number of teeth on the fourteenth gear is within twenty percent of 0.88.

13. The twenty-four speed powershift transmission for a work machine of claim 3, wherein the number of teeth on the eighteenth gear divided by the number of teeth on the fifteenth gear is within twenty percent of 2.90.

14. The twenty-four speed powershift transmission for a work machine of claim 3, wherein the first and second range clutches form a second double clutch.

15. The twenty-four speed powershift transmission for a work machine of claim 3, wherein when the powershift transmission is operating in a forward mode, one of the low clutch and high clutch is engaged, one of the speed clutches is engaged, and one of the range clutches is engaged.

16. The twenty-four speed powershift transmission for a work machine of claim 3, wherein the powershift transmission operates in twenty-four different forward modes, and the transmission ratio of the first mode divided by the transmission ratio of the twenty-fourth mode is within twenty percent of 26.2.

17. The twenty-four speed powershift transmission for a work machine of claim 3, wherein the powershift transmission operates in twenty-four different forward modes, and all of the forward transmission steps are less than seventeen percent.

18. The twenty-four speed powershift transmission for a work machine of claim 3, comprising:

a reverse clutch mounted about the input shaft and fixed for rotation therewith;

a reverse drive gear mounted about the input shaft, wherein the reverse drive gear is in communication for engagement with the reverse clutch such that engagement of reverse clutch fixes the reverse drive gear for rotation with the input shaft;

an idler shaft rotatably mounted to the housing;

a reverse idler gear mounted about the idler shaft and fixed for rotation therewith, wherein the reverse idler gear is in constant mesh with the reverse drive gear; and a reverse driven gear mounted about the first countershaft and fixed for rotation therewith, wherein the reverse driven gear is in constant mesh with the reverse idler gear.

19. The twenty-four speed powershift transmission for a work machine of claim 18, wherein when the powershift transmission is operating in a reverse mode, the reverse clutch is engaged, one of the speed clutches is engaged, and one of the range clutches is engaged.

* * * * *